No. 690,234.　　　　　　　　　　　　　　　　　　　　Patented Dec. 31, 1901.
B. J. CLOES.
THILL COUPLING.
(Application filed Oct. 15, 1901.)
(No Model.)
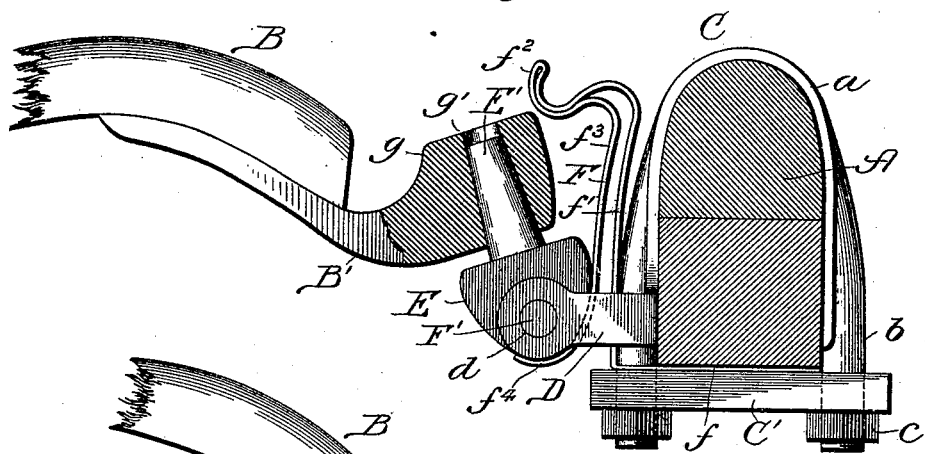
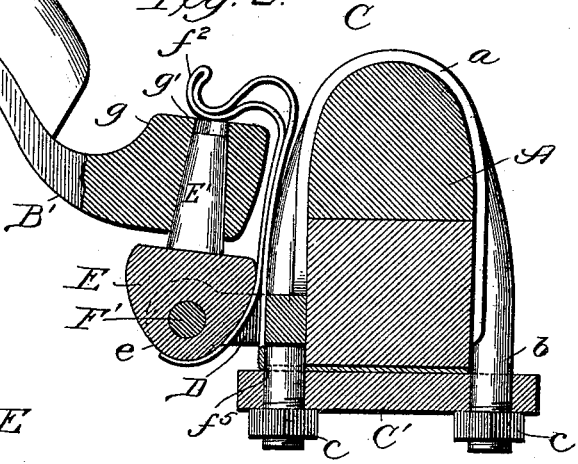
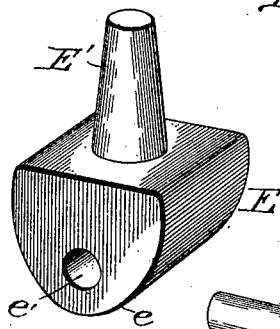
Witnesses:　　　　　　　　　　　　　　　　　　　Inventor:
Chas. L. Gaylord.　　　　　　　　　　　　　　　Benjamin J. Cloes,
John Enders, Jr.　　　　　　　　　　　　　　　By Dyrenforth, Dyrenforth and Lee,
　　　　　　　　　　　　　　　　　　　　　　　　Att'ys.

ized by the swinging movement of said block, substantially as set forth.

UNITED STATES PATENT OFFICE.

BENJAMIN J. CLOES, OF LAKE BLUFF, ILLINOIS.

THILL-COUPLING.

SPECIFICATION forming part of Letters Patent No. 690,234, dated December 31, 1901.

Application filed October 15, 1901. Serial No. 78,699. (No model.)

*To all whom it may concern:*

Be it known that I, BENJAMIN J. CLOES, a citizen of the United States, residing at Lake Bluff, in the county of Lake and State of Illinois, have invented a new and useful Improvement in Thill-Couplings, of which the following is a specification.

My object is to provide a thill-coupling of a simple and improved construction adapting it to operate as a ready and desirable means for attaching the shafts to and detaching them from a vehicle and which when in engagement will hold the shafts securely against separation and prevent rattling between the coupled parts in the movement of the vehicle.

In the drawings, Figure 1 is a broken sectional view at the axle of a vehicle, showing one of my improved couplings in place with the parts opened, as when the thills are lowered to the ground at their free ends; Fig. 2, a similar view showing the position of the coupling members when the thills are raised, and Figs. 3 and 4 enlarged detailed perspective views, respectively, of a swinging coupling member and a spring, both forming features of my improvement.

A represents the axle of a vehicle, and B one of a pair of thills.

C is a clip having a web $a$, which fits over the axle, and having legs $b$, passing through the perforated washer or clip-bar C'. The clip is secured in place with nuts $c$ in the usual manner. Integral with and extending forward from the web $a$ at opposite sides are ears or projections D, provided near their ends with bearing-openings $d$.

E is a coupling block or member formed, preferably, with a curved under side $e$ and provided on its upper side with a central lug E', which may be of the frusto-conical shape shown. The block E fits without lateral play between the ears $e$ and has an opening through it at $e'$ to receive a pin F', journaled in the bearing-openings $d$ of the ears D.

F is a spring having the flat attaching end $f$, main body portion $f'$, overhanging part $f^2$, and free portion $f^3$, terminating in a curved end portion $f^4$. The attaching part $f$ has a perforation $f^5$ to pass over the forward leg of the clip, and the spring is secured in place, as shown, being held at its part $f$ between the clip-bar C' and under surface of the axle. The curved free end portion $f^4$ of the spring fits against the curved surface $e$ of the block E to hold the block normally in a slanting position, as shown in Fig. 1.

Secured to the thill B is a thill-iron B', having a head portion $g$, provided with a vertical opening $g'$ through it. The opening $g'$ may be of tapering form, as shown, to fit closely over the lug E'. Each of the pair of thills is provided with a thill-iron B', and there are two clips C, carrying coupling members in proper position upon the axle.

To couple the thills to the vehicle, they are merely passed at the openings $g'$ of the thill-irons over the lugs E', while they extend, as shown in Fig. 1. Raising the thills at their free ends turns the blocks E to the position shown in Fig. 2, causing the thill-iron heads $g$ to slide under the housing or retaining parts $f^2$ of the spring. While a horse is harnessed between the thills the latter will be retained in the position shown in Fig. 2. They are held down against separation by the springs F. The pressure of the spring against the thill-iron or coupling member B' and against the coupling member E will hold these parts against danger of rattling. When the horse is unhitched from the thills, the latter will drop to the position shown in Fig. 1, when they may be readily lifted off and set to one side.

The principal feature of my invention lies in providing the swinging blocks with which the coupling members of the thills engage and on which they are held by retainers which overhang the parts when the thills are raised.

While I prefer to construct my improvements throughout as shown and described, they may be variously modified in the matter of details without departing from the spirit of my invention as defined by the claims.

What I claim as new, and desire to secure by Letters Patent, is—

1. In a thill-coupling, the combination of mutually attachable and detachable coupling members secured respectively to the thill and vehicle, one said member being a vertically-swinging block, a socket in one said member and a lug on the other said member to fit said socket, and an engaging and releasing retainer for said members operating to engage and hold them together when the thills are raised and to release them for disengagement when the thills are lowered, substantially as set forth.

2. In a thill-coupling, the combination of a vertically-swinging coupling member on the vehicle, a thill-iron forming the other coupling member, a socket in one said member, and a lug on the other said member to enter said socket, and a resilient engaging and releasing retainer on the vehicle for said thill-iron which engages the thill-iron to hold the members together as the thill is raised, and which releases the thill-iron when the thill is lowered, substantially as and for the purpose set forth.

3. In a thill-coupling, the combination of a vertically-swinging coupling-block on the vehicle having an upward-extending lug, a thill-iron having a socket to pass over said lug, and a resilient engaging and releasing retainer on the vehicle for the thill-iron which engages the thill-iron to hold it upon said lug as the thill is raised and releases the thill-iron when the thill is lowered, substantially as and for the purpose set forth.

4. In a thill-coupling, the combination of a vertically-swinging coupling member on the vehicle, a thill-iron forming the other coupling member, a socket in one said member and a lug on the other said member to enter said socket, and a spring upon the vehicle bearing against the swinging block to maintain it normally inclined and having an overhanging thill-iron engaging and releasing part operating to engage and hold down the thill-iron when the thill is raised and release the thill-iron when the thill is lowered, substantially as and for the purpose set forth.

5. A thill-coupling, comprising a clip upon the axle, a vertically-swinging coupling-block mounted in the clip and provided with an upward-extending lug, a spring secured to the axle and having a projecting part extending over said block, and an end portion bearing against said block to maintain the lug normally in a forward-inclined position, and a thill-iron having an opening to fit closely over said lug and operating to pass under and in contact with said projecting part of the spring when the thill is raised, and to pass from under said projecting part when the thill is lowered, substantially as and for the purpose set forth.

BENJAMIN J. CLOES.

In presence of—
ALBERT D. BACCI,
WM. B. DAVIES.